(12) United States Patent
Tsai et al.

(10) Patent No.: US 10,887,589 B2
(45) Date of Patent: Jan. 5, 2021

(54) BLOCK SIZE DETERMINATION FOR VIDEO CODING SYSTEMS AND METHODS

(71) Applicant: RealNetworks, Inc., Seattle, WA (US)

(72) Inventors: Chia-Yang Tsai, Bellevue, WA (US); Chao Kuang, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 0 days.

(21) Appl. No.: 16/383,452

(22) Filed: Apr. 12, 2019

(65) Prior Publication Data

US 2020/0329237 A1    Oct. 15, 2020

(51) Int. Cl.
    H04N 11/02     (2006.01)
    H04N 19/115    (2014.01)
    H04N 19/167    (2014.01)
    H04N 19/176    (2014.01)

(52) U.S. Cl.
    CPC ......... *H04N 19/115* (2014.11); *H04N 19/167* (2014.11); *H04N 19/176* (2014.11)

(58) Field of Classification Search
    CPC .................................................. H04N 19/115
    USPC ........................................ 375/240.01–240.29
    See application file for complete search history.

(56) References Cited

U.S. PATENT DOCUMENTS

| | | | |
|---|---|---|---|
| 5,832,103 A * | 11/1998 | Giger | G06K 9/00127 382/130 |
| 6,370,480 B1 * | 4/2002 | Gupta | A61B 8/00 702/39 |
| 9,888,247 B2 | 2/2018 | Rintaluoma et al. | |
| 2003/0007698 A1 * | 1/2003 | Govindaswamy | H04N 19/176 382/250 |
| 2003/0081838 A1 | 5/2003 | Teng | |

(Continued)

FOREIGN PATENT DOCUMENTS

CN     102763411 A    10/2012

OTHER PUBLICATIONS

Panusopone et al., "Efficient Transform Unit Representation," JCTVC-D250, *Joint Collaborative Team on Video Coding (JCT-VC) of ITU-T SG16 WP3 and ISO/IEC JTC1/SC29/WG11*, Daegu, South Korea, Jan. 20-28, 2011, 2 pages.

(Continued)

*Primary Examiner* — Leron Beck
(74) *Attorney, Agent, or Firm* — Seed IP Law Group LLP

(57) ABSTRACT

A block processing procedure to determine coding-block or transform-block sizes for encoded and decoding video data. An encoder obtains unencoded video data and selects a region-of-interest in the video data. Image characteristics of the video data are determined from the region-of-interest and a block size is determined from those image characteristics. The video data is encoded using the block size without storing the block size in a header associated with the encoded data. A decoder obtains the encoded data and selects a second region-of-interest in the encoded data that corresponds to the unencoded data region-of-interest. Second image characteristics are determined from the second region-of-interest, where the second characteristics are the same as the characteristics determined for the unencoded data. A block size is determined from the second image characteristics without using a header associated with the encoded data. The encoded data is decoded based on the determined block size.

16 Claims, 13 Drawing Sheets

(56) References Cited

U.S. PATENT DOCUMENTS

| | | | |
|---|---|---|---|
| 2004/0096111 A1* | 5/2004 | Thyagarajan | H04H 60/04 382/239 |
| 2005/0119642 A1* | 6/2005 | Grecu | A61B 3/113 606/5 |
| 2005/0249277 A1* | 11/2005 | Ratakonda | H04N 19/176 375/240.03 |
| 2006/0018382 A1* | 1/2006 | Shi | H04N 5/145 375/240.16 |
| 2006/0039617 A1 | 2/2006 | Makai et al. | |
| 2006/0133505 A1* | 6/2006 | Watanabe | H04N 19/105 375/240.16 |
| 2006/0140497 A1* | 6/2006 | Kondo | G06K 9/4609 382/254 |
| 2008/0137753 A1 | 6/2008 | He | |
| 2009/0175349 A1 | 7/2009 | Ye et al. | |
| 2011/0135000 A1 | 6/2011 | Alshina et al. | |
| 2011/0317762 A1 | 12/2011 | Sankaran | |
| 2012/0230411 A1 | 9/2012 | Liu et al. | |
| 2013/0039415 A1 | 2/2013 | Kim et al. | |
| 2013/0094572 A1 | 4/2013 | Van der Auwera et al. | |
| 2013/0147843 A1* | 6/2013 | Shimizu | G06T 11/60 345/647 |
| 2013/0170555 A1* | 7/2013 | Zhang | H04N 19/176 375/240.18 |
| 2013/0343449 A1* | 12/2013 | Oishi | H04N 19/50 375/240.03 |
| 2013/0343462 A1 | 12/2013 | Li et al. | |
| 2014/0254670 A1 | 9/2014 | Kwon et al. | |
| 2014/0307079 A1* | 10/2014 | Aragaki | G02B 21/367 348/79 |
| 2015/0131889 A1* | 5/2015 | Aragaki | G06T 7/42 382/133 |
| 2015/0245070 A1 | 8/2015 | Sun et al. | |
| 2016/0048971 A1* | 2/2016 | Matsumoto | G06T 9/004 382/173 |
| 2016/0255344 A1* | 9/2016 | Lee | H04N 19/105 375/240.13 |
| 2016/0269730 A1 | 9/2016 | Jeon et al. | |
| 2016/0353122 A1 | 12/2016 | Krajcevski et al. | |
| 2017/0180737 A1 | 6/2017 | Ye et al. | |
| 2018/0061199 A1* | 3/2018 | Sakomizu | H04N 19/167 |

OTHER PUBLICATIONS

Sullivan et al., "Overview of the High Efficiency Video Coding (HEVC) Standard," *IEEE Transactions on Circuits and Systems for Video Technology* 22(12):1649-1668, 2012.

Wiegand et al., "WD1: Working Draft 1 of High-Efficiency Video Coding," JCTVC-C403, *Joint Collaborative Team on Video Coding (JCT-VC) of ITU-T SG16 WP3 and ISO/IEC JTC1/SC29/WG11*, Guangzhou, China, Oct. 7-15, 2010, 137 pages.

Wien, "Integer Transforms for Variable Block Size Transform Coding," *Picture Coding Symposium*, Saint Malo, France, Apr. 23, 2003, 6 pages.

Zhang et al., "Systematic Approach of Fixed Point 8x8 IDCT and DCT Design and Implementation," *Picture Coding Symposium*, Beijing, China, Apr. 24, 2006, 6 pages.

Zhou, "16 bit integer transform and quantization," Document No. VCEG-N022, *ITU—Telecommunications Standardization Sector: 14th Meeting of the Video Coding Experts Group*, Santa Barbara, California, USA, Sep. 10, 2001, 13 pages.

PCT/US2020/027521—International Search Report and Written Opinion, dated Jul. 21, 2020, 9 pages.

* cited by examiner

BLOCK SIZE DETERMINATION FOR VIDEO CODING SYSTEMS AND METHODS

FIELD

This disclosure relates to encoding and decoding of video signals, and more particularly, to codebook-based encoding and decoding of adaptive filters used for impairments compensation.

BACKGROUND

The advent of digital multimedia such as digital images, speech/audio, graphics, and video have significantly improved various applications, as well as opened up brand new applications, due to the relative ease by which it has enabled reliable storage, communication, transmission, and, search and access of content. Overall, the applications of digital multimedia have been many, encompassing a wide spectrum including entertainment, information, medicine, and security, and have benefited society in numerous ways. Multimedia as captured by sensors such as cameras and microphones is often analog, and the process of digitization in the form of Pulse Coded Modulation (PCM) renders it digital. However, just after digitization, the amount of resulting data can be quite significant as is necessary to re-create the analog representation needed by speakers and/or TV display. Thus, efficient communication, storage, or transmission of the large volume of digital multimedia content requires its compression from raw PCM form to a compressed representation. Thus, many techniques for compression of multimedia have been invented. Over the years, video compression techniques have grown very sophisticated, to the point that they can often achieve high compression factors between 10 and 100 while retaining high psycho-visual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, smartphones, and wearable computing devices, fueling the desire for even higher levels of video compression. In the standards-body-driven standards, this is evidenced by the recently started effort by ISO MPEG in High Efficiency Video Coding (HVEC), which is expected to combine new technology contributions and technology from a number of years of exploratory work on H.265 video compression by the ITU-T standards committee.

All aforementioned standards employ a general inter-frame predictive coding framework that involves reducing temporal redundancy by compensating for motion between frames of video. The basic concept is to remove the temporal dependencies between neighboring pictures by using a block matching method. At the outset of an encoding process, each frame of the unencoded video sequence is grouped into one of three categories: I-type frames, P-type frames, and B-type frames. I-type frames are intra-coded. That is, only information from the frame itself is used to encode the picture and no inter-frame motion compensation techniques are used (although intra-frame motion compensation techniques may be applied).

The other two types of frames, P-type and B-type, are encoded using inter-frame motion compensation techniques. The difference between P-picture and B-picture is the temporal direction of the reference pictures used for motion compensation. P-type pictures utilize information from previous pictures (in display order), whereas B-type pictures may utilize information from both previous and future pictures (in display order).

For P-type and B-type frames, each frame is then divided into blocks of pixels, represented by coefficients of each pixel's luma and chrominance components, and one or more motion vectors are obtained for each block (because B-type pictures may utilize information from both a future and a past coded frame, two motion vectors may be encoded for each block). A motion vector (MV) represents the spatial displacement from the position of the current block to the position of a similar block in another, previously encoded frame (which may be a past or future frame in display order), respectively referred to as a reference block and a reference frame. The difference, if any, between the reference block and the current block is determined and a residual (also referred to as a "residual signal") is obtained. Therefore, for each block of an inter-coded frame, only the residuals and motion vectors need to be encoded rather than the entire contents of the block. By removing this kind of temporal redundancy between frames of a video sequence, the video sequence can be compressed.

To further compress the video data, after inter or intra frame prediction techniques have been applied, the coefficients of the residual signal are often transformed from the spatial domain to the frequency domain (e.g., using a discrete cosine transform ("DCT") or a discrete sine transform ("DST")). For naturally occurring images, such as the type of images that typically make up human perceptible video sequences, low-frequency energy is always stronger than high-frequency energy. Residual signals in the frequency domain therefore get better energy compaction than they would in spatial domain. After forward transform, the coefficients and motion vectors may be quantized and entropy encoded before being packetized or otherwise processed, e.g., for transmission over a network such as the Internet.

On the decoder side, inversed quantization and inversed transforms are applied to recover the spatial residual signal. These are typical transform/quantization processes in many video compression standards. A reverse prediction process may then be performed in order to generate a recreated version of the original unencoded video sequence.

In past standards, the blocks used in coding were generally sixteen by sixteen pixels (referred to as macroblocks in many video coding standards). However, since the development of these standards, frame sizes have grown larger and many devices have gained the capability to display higher than "high definition" (or "HD") frame sizes, such as 2048×1530 pixels. Thus it may be desirable to have larger blocks to efficiently encode the motion vectors for these frame sizes, e.g., 64×64 pixels. It follows that it is also desirable to increase the size of the blocks of residual signals that are transformed from the spatial domain to the frequency domain.

DETAILED DESCRIPTION

Figure 1:
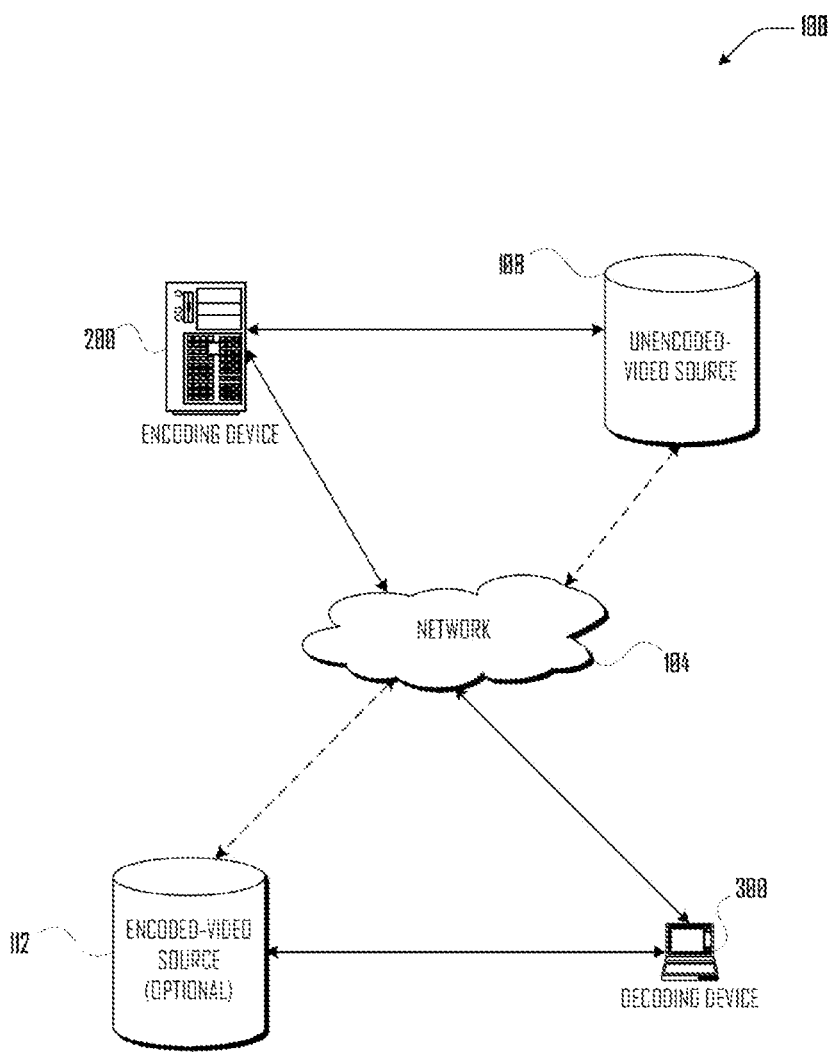
FIG. 1 illustrates an exemplary video encoding/decoding system according to one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers and memory storage devices. Each of these conventional distributed computing components is accessible by the processor via a communication network.

The phrases "in one embodiment," "in at least one embodiment," "in various embodiments," "in some embodiments," and the like may be used repeatedly herein. Such phrases do not necessarily refer to the same embodiment. The terms "comprising," "having," and "including" are synonymous, unless the context dictates otherwise. Various embodiments are described in the context of a typical "hybrid" video coding approach, as was described generally above, in that it uses inter-/intra-picture prediction and transform coding.

Reference is now made in detail to the description of the embodiments as illustrated in the drawings. While embodiments are described in connection with the drawings and related descriptions, it will be appreciated by those of ordinary skill in the art that alternate and/or equivalent implementations may be substituted for the specific embodiments shown and described, including all alternatives, modifications, and equivalents, whether or not explicitly illustrated and/or described, without departing from the scope of the present disclosure. In various alternate embodiments, additional devices, or combinations of illustrated devices, may be added to, or combined, without limiting the scope of the embodiments disclosed herein.

1. Exemplary Video Encoding/Decoding System

FIG. 1 illustrates an exemplary video encoding/decoding system 100 in accordance with at least one embodiment. Encoding device 200 (illustrated in FIG. 2 and described below) and decoding device 300 (illustrated in FIG. 3 and described below) are in data communication with a network 104. Decoding device 200 may be in data communication with unencoded video source 108, either through a direct data connection such as a storage area network ("SAN"), a high speed serial bus, and/or via other suitable communication technology, or via network 104 (as indicated by dashed lines in FIG. 1). Similarly, encoding device 300 may be in data communication with an optional encoded video source 112, either through a direct data connection, such as a storage area network ("SAN"), a high speed serial bus, and/or via other suitable communication technology, or via network 104 (as indicated by dashed lines in FIG. 1). In some embodiments, encoding device 200, decoding device 300, encoded-video source 112, and/or unencoded-video source 108 may comprise one or more replicated and/or distributed physical or logical devices. In many embodiments, there may be more encoding devices 200, decoding devices 300, unencoded-video sources 108, and/or encoded-video sources 112 than are illustrated.

In various embodiments, encoding device 200 may be a networked computing device generally capable of accepting requests over network 104, e.g., from decoding device 300, and providing responses accordingly. In various embodiments, decoding device 300 may be a networked computing device having a form factor such as a mobile-phone; watch, heads-up display, or other wearable computing device; a dedicated media player; a computing tablet; a motor vehicle head unit; an audio-video on demand (AVOD) system; a dedicated media console; a gaming device; a "set-top box;" a digital video recorder; a television; or a general purpose computer. In various embodiments, network 104 may include the Internet, one or more local area networks ("LANs"), one or more wide area networks ("WANs"), cellular data networks, and/or other data networks. Network 104 may, at various points, be a wired and/or wireless network.

2. Exemplary Encoding Device

Figure 2:
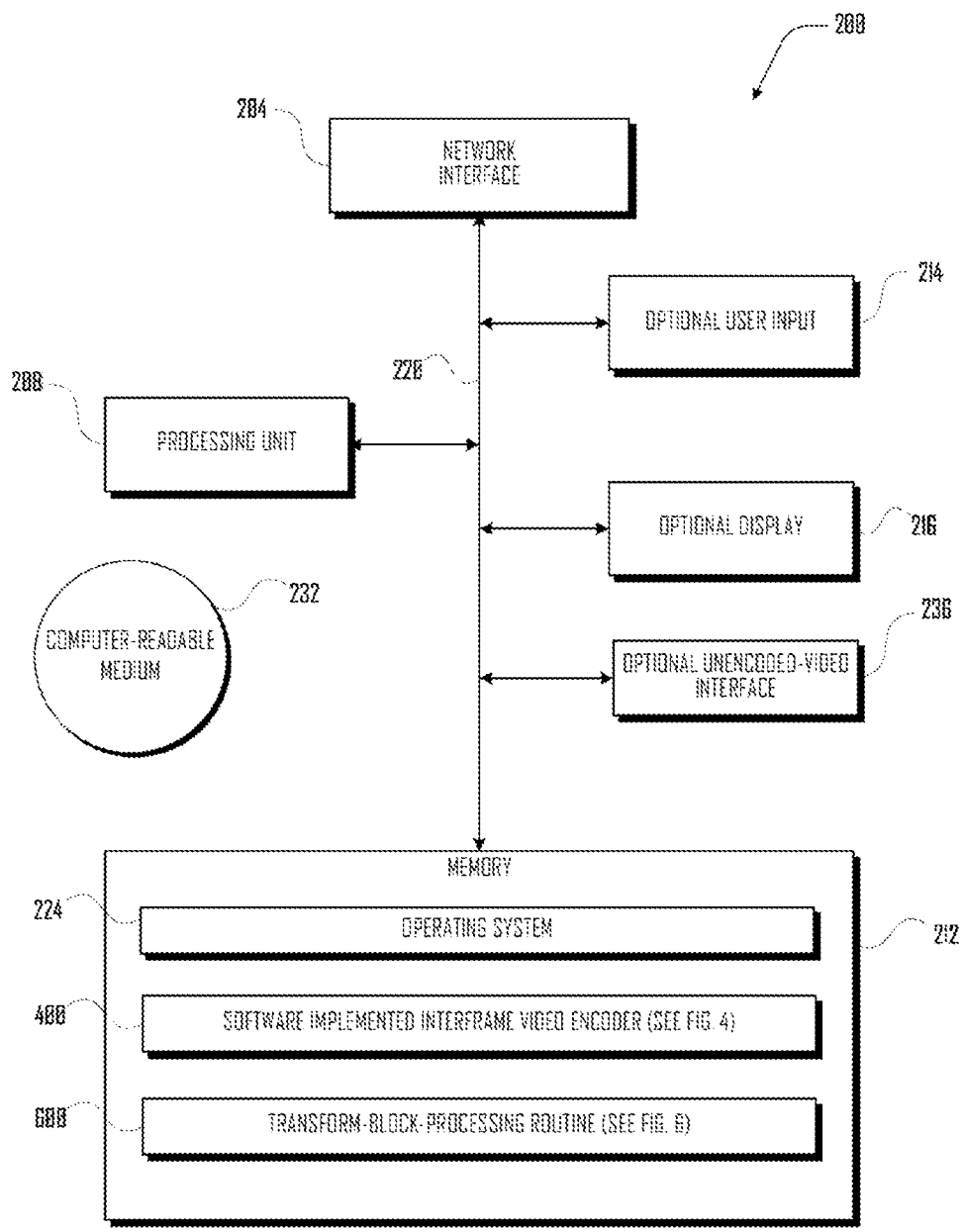
FIG. 2 illustrates several components of an exemplary encoding device, in accordance with one embodiment.

Referring to FIG. 2, several components of an exemplary encoding device 200 are illustrated. In some embodiments, an encoding device may include many more components than those shown in FIG. 2. However, it is not necessary that all of these generally conventional components be shown in order to disclose an illustrative embodiment. As shown in FIG. 2, exemplary encoding device 200 includes a network interface 204 for connecting to a network, such as network 104. Exemplary encoding device 200 also includes a processing unit 208, a memory 212, an optional user input 214 (e.g., an alphanumeric keyboard, keypad, a mouse or other pointing device, a touchscreen, and/or a microphone), and an optional display 216, all interconnected along with the network interface 204 via a bus 220. The memory 212 generally comprises a RAM, a ROM, and a permanent mass storage device, such as a disk drive, flash memory, or the like.

The memory 212 of exemplary encoding device 200 stores an operating system 224 as well as program code for a number of software services, such as software implemented interframe video encoder 400 (described below in reference to FIG. 4) with instructions for performing a transform-block-processing routine 600 (described below in reference to FIG. 6). Memory 212 may also store video data files (not shown) which may represent unencoded copies of audio/visual media works, such as, by way of examples, movies and/or television episodes. These and other software components may be loaded into memory 212 of encoding device 200 using a drive mechanism (not shown) associated with a non-transitory computer-readable medium 232, such as a floppy disc, tape, DVD/CD-ROM drive, USB drive, memory card, or the like.

In operation, the operating system 224 manages the hardware and other software resources of the encoding device 200 and provides common services for software applications, such as software implemented interframe video encoder 400. For hardware functions such as network communications via network interface 204, receiving data via input 214, outputting data via optional display 216, and allocation of memory 212 for various software applications, such as software implemented interframe video encoder 400, operating system 224 acts as an intermediary between software executing on the encoding device and the hardware.

In some embodiments, encoding device 200 may further comprise a specialized unencoded video interface 236 for communicating with unencoded-video source 108, such as a high speed serial bus, or the like. In some embodiments, encoding device 200 may communicate with unencoded-video source 108 via network interface 204. In other embodiments, unencoded-video source 108 may reside in memory 212 or computer readable medium 232.

Although an exemplary encoding device 200 has been described that generally conforms to conventional general purpose computing devices, an encoding device 200 may be any of a great number of devices capable of executing instructions for encoding video in accordance with various embodiments, such as exemplary software implemented video encoder 400, and transform-block-processing routine 600, for example, a video recording device, a video co-processor and/or accelerator, a personal computer, a game console, a set-top box, a handheld or wearable computing device, a smart phone, or any other suitable device.

Encoding device 200 may, by way of example, be operated in furtherance of an on-demand media service (not shown). In at least one exemplary embodiment, the on-demand media service may be operating encoding device 200 in furtherance of an online on-demand media store providing digital copies of media works, such as video content, to users on a per-work and/or subscription basis. The on-demand media service may obtain digital copies of such media works from unencoded video source 108.

3. Exemplary Decoding Device

Figure 3:
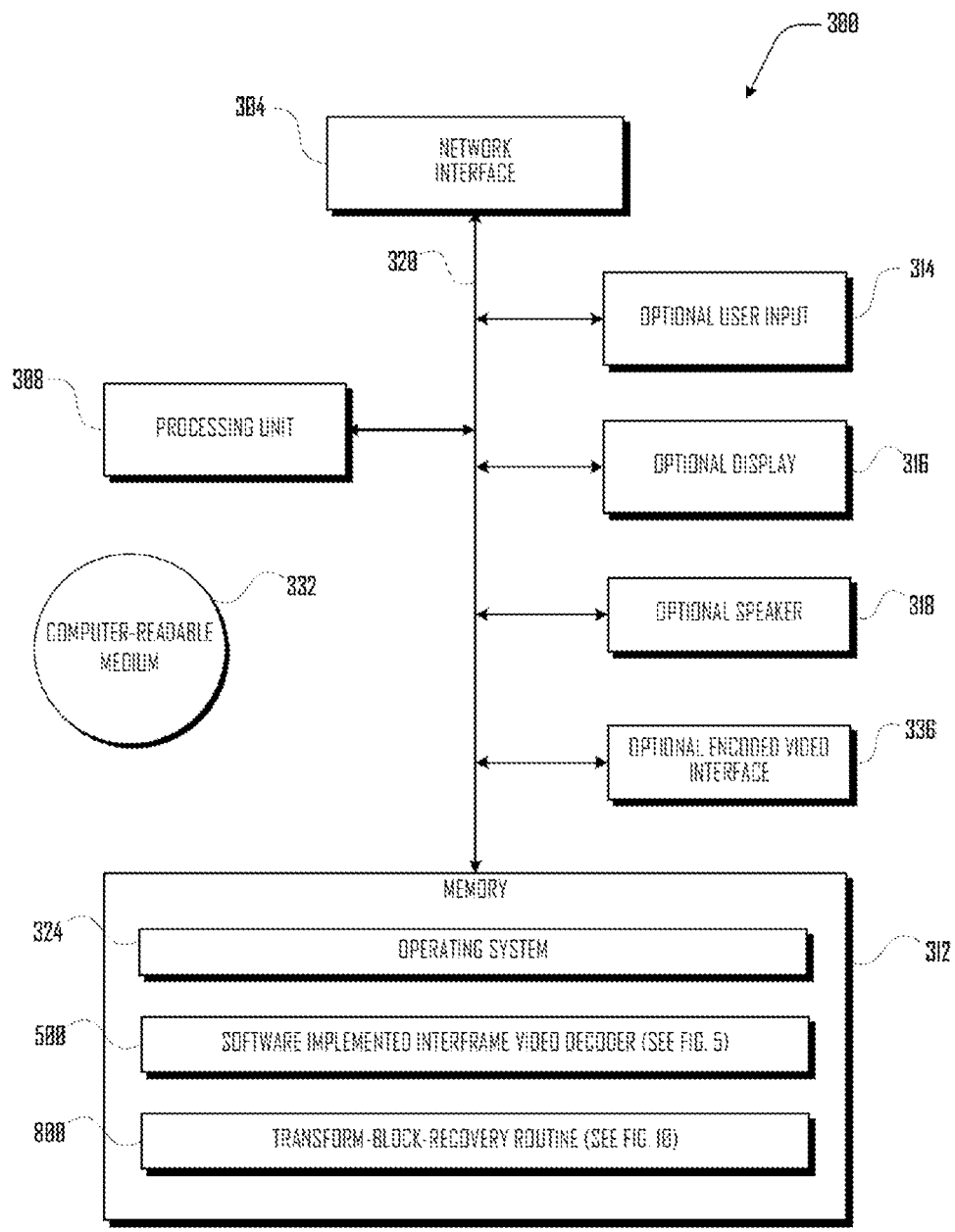
FIG. 3 illustrates several components of an exemplary decoding device, in accordance with one embodiment.

Referring to FIG. 3, several components of an exemplary decoding device 300 are illustrated. In some embodiments, a decoding device may include many more components than those shown in FIG. 3. However, it is not necessary that all of these generally conventional components be shown in order to disclose an illustrative embodiment. As shown in FIG. 3, exemplary decoding device 300 includes a network interface 304 for connecting to a network, such as network 104. Exemplary decoding device 300 also includes a processing unit 308, a memory 312, an optional user input 314 (e.g., an alphanumeric keyboard, keypad, a mouse or other pointing device, a touchscreen, and/or a microphone), an optional display 316, and an optional speaker 318, all interconnected along with the network interface 304 via a bus 320. The memory 312 generally comprises a RAM, a ROM, and a permanent mass storage device, such as a disk drive, flash memory, or the like.

The memory 312 of exemplary decoding device 300 may store an operating system 324 as well as program code for a number of software services, such as software implemented video decoder 500 (described below in reference to FIG. 5) with instructions for performing a transform-block-recovery routine 1000 (described below in reference to FIG. 10). Memory 312 may also store video data files (not shown) which may represent encoded copies of audio/visual media works, such as, by way of example, movies and/or television episodes. These and other software components may be loaded into memory 312 of decoding device 300 using a drive mechanism (not shown) associated with a non-transitory computer-readable medium 332, such as a floppy disc, tape, DVD/CD-ROM drive, memory card, or the like.

In operation, the operating system 324 manages the hardware and other software resources of the decoding device 300 and provides common services for software applications, such as software implemented video decoder 500. For hardware functions such as network communications via network interface 304, receiving data via input 314, outputting data via optional display 316 and/or optional speaker 318, and allocation of memory 312, operating system 324 acts as an intermediary between software executing on the encoding device and the hardware.

In some embodiments, decoding device 300 may further comprise an optional encoded video interface 336, e.g., for communicating with encoded-video source 116, such as a high speed serial bus, or the like. In some embodiments, decoding device 300 may communicate with an encoded-video source, such as encoded video source 116, via network interface 304. In other embodiments, encoded-video source 116 may reside in memory 312 or computer readable medium 332.

Although an exemplary decoding device 300 has been described that generally conforms to conventional general purpose computing devices, a decoding device 300 may be any of a great number of devices capable of executing instructions for decoding video in accordance with various embodiments, such as exemplary software implemented video decoder 500, and transform-block-recovery routine 1000, for example, a video recording device, a video co-processor and/or accelerator, a personal computer, a game console, a set-top box, a handheld or wearable computing device, a smart phone, or any other suitable device. Decoding device 300 may, by way of example, be operated in cooperation with the on-demand media service. In at least one exemplary embodiment, the on-demand media service may provide digital copies of media works, such as video content, to a user operating decoding device 300 on a per-work and/or subscription basis. The decoding device may obtain digital copies of such media works from unencoded video source 108 via, for example, encoding device 200 via network 104.

4. Software Implemented Interframe Video Encoder

Figure 4:
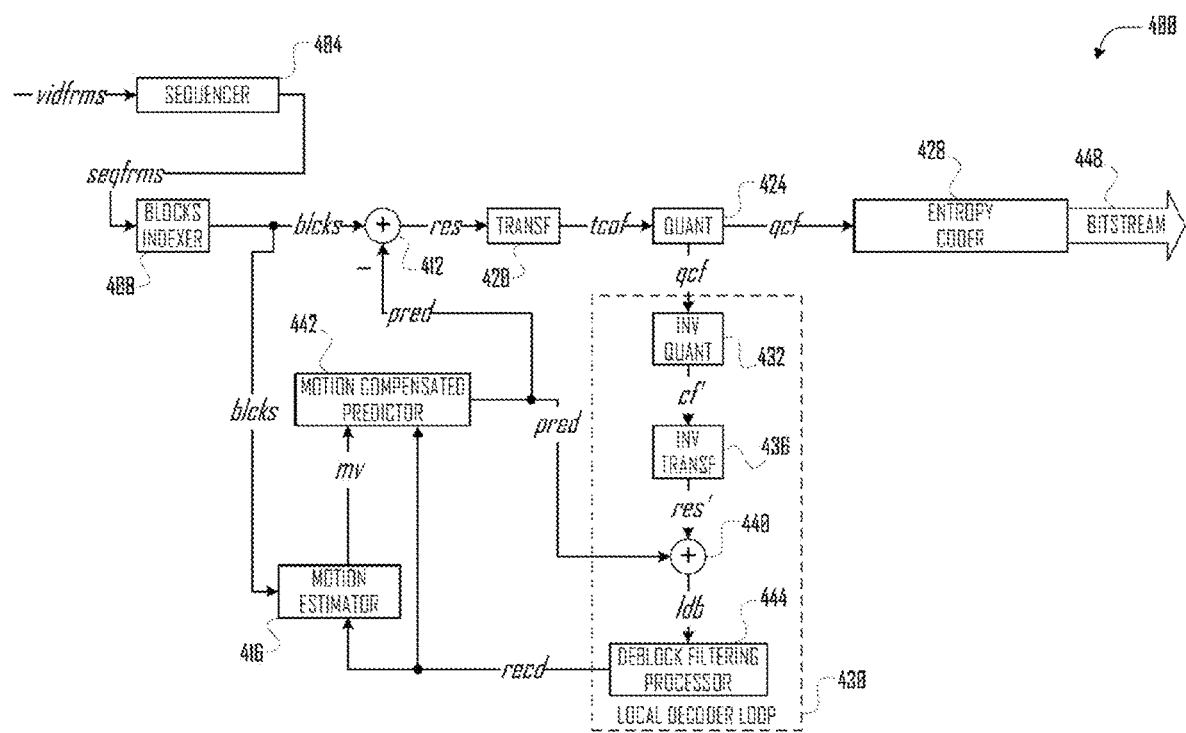
FIG. 4 illustrates a block diagram of an exemplary video encoder in accordance with at least one embodiment.

FIG. 4 shows a general functional block diagram of software implemented interframe video encoder 400 (hereafter "encoder 400") employing residual transformation techniques in accordance with at least one embodiment. One or more unencoded video frames (vidfrms) of a video sequence in display order may be provided to sequencer 404.

Sequencer 404 may assign a predictive-coding picture-type (e.g., I, P, or B) to each unencoded video frame and reorder the sequence of frames, or groups of frames from the sequence of frames, into a coding order for motion prediction purposes (e.g., I-type frames followed by P-type frames, followed by B-type frames). The sequenced unencoded video frames (seqfrms) may then be input in coding order to blocks indexer 408.

For each of the sequenced unencoded video frames (seqfrms), blocks indexer 408 may determine a largest coding block ("LCB") size for the current frame (e.g., sixty-four by sixty-four pixels) and divide the unencoded frame into an array of coding blocks (blks). Individual coding blocks within a given frame may vary in size, e.g., from four by four pixels up to the LCB size for the current frame.

Each coding block may then be input one at a time to differencer 412 and may be differenced with corresponding prediction signal blocks (pred) generated from previously encoded coding blocks. To generate the prediction blocks (pred), coding blocks (cblks) are also provided to motion estimator 416. After differencing at differencer 412, a resulting residual block (res) may be forward-transformed to a frequency-domain representation by transformer 420 (discussed below), resulting in a block of transform coefficients (tcof). The block of transform coefficients (tcof) may then be sent to the quantizer 424 resulting in a block of quantized coefficients (qcf) that may then be sent both to an entropy coder 428 and to a local decoding loop 430.

At the beginning of local decoding loop 430, inverse quantizer 432 may de-quantize the quantized coefficients (qcf) and pass the resulting de-quantized coefficients (cf') to inverse transformer 436 to generate a de-quantized residual block (res'). At adder 440, a prediction block (pred) from motion compensated predictor 442 may be added to the de-quantized residual block (res') to generate a locally decoded block (ldb). Locally decoded block (ldb) may then be sent to a frame assembler and deblock filter processor 444, which reduces blockiness and assembles a recovered frame (recd), which may be used as the reference frame for motion estimator 416 and motion compensated predictor 442.

Entropy coder 428 encodes the quantized transform coefficients (qcf), differential motion vectors (dmv), and other data, generating an encoded video bit-stream 448. For each frame of the unencoded video sequence, encoded video bit-stream 448 may include encoded picture data (e.g., the encoded quantized transform coefficients (qcf) and differential motion vectors (dmv)) and an encoded frame header (e.g., syntax information such as the LCB size for the current frame).

5. Forward Integer Transform Procedures

Referring to the functionality of transformer 420, the transformer receives a block of residual values for each coding block's luma and chroma values and divides the block of residual values into one or more luma and chroma transform blocks.

In at least one embodiment, a coding block is divided into transform blocks sized according to the current coding block size as well as the size of the prediction block(s) used for motion estimation for the coding block. For example, transform block size may be assigned according to the combinations shown in Table 1, below. Transformer 420 may also set a maximum-transform-block-size flag in the picture header for the current frame.

TABLE 1

| CB size | PB size | Luma TB size | Chroma TB size |
|---|---|---|---|
| 8 × 8 | 8 × 8 | 8 × 8 | 4 × 4 |
|  | other | 4 × 4 | 4 × 4 |
| 16 × 16 | 16 × 16 | 16 × 16 | 8 × 8 |
|  | other | 4 × 4 | 4 × 4 |
| >=32 × 32 | 32 × 32 | 16 × 16 | 8 × 8 |
|  | other | 16 × 16 | 8 × 8 |

After a coding block is divided into transform blocks, the residual values in the transform blocks are converted from the spatial domain to the frequency domain, for example via a forward DCT transform operation. In at least one embodiment, in order to increase coding efficiency, integer equivalents of the transform block's residual values are obtained and a forward integer DCT transform operation may be performed. In order to further increase coding efficiency, it may be advantageous to utilize a single-instruction-multiple-data (SIMD) instruction architecture in the video coding process. However, most common implementations of SIMD instruction architecture require a bit-width of sixteen bits. Therefore, in at least one embodiment, bit-shifting operations may be performed on the residual values after some forward transformation operations (and, on the decoder side, on the transform coefficients after some inverse transformation operations) to ensure the residual values and transform coefficients may be represented by sixteen bit integers.

In at least one embodiment, for a 4×4 transform block, transformer 420 may perform a forward integer DCT transform operation according to the following equation:

$$\vec{y} = T_{4\times4}\vec{x}$$

Where: $\vec{x}$ is the input residual-value vector for the current transform block, $\vec{y}$ is the output vector for the transform operation, and $T_{4\times4}$ is a 4×4 forward integer transform matrix, given by:

$$T_{4\times4} = \begin{bmatrix} 13 & 13 & 13 & 13 \\ 17 & 7 & -7 & -17 \\ 13 & -13 & -13 & 13 \\ 7 & -17 & 17 & -7 \end{bmatrix}$$

In at least one embodiment, in the case of an 8×8 transform block, transformer 420 may perform a forward integer DCT transform operation according to the following equation:

$$\vec{y} = T_{8\times8}\vec{x}$$

Where: $\vec{x}$ is the input residual-value vector for the current transform block, $\vec{y}$ is the output vector for the transform operation, and $T_{8\times8}$ is an 8×8 forward integer transform matrix, given by:

$$T_{8\times8} = \begin{bmatrix} 37 & 37 & 37 & 37 & 37 & 37 & 37 & 37 \\ 51 & 43 & 29 & 10 & -10 & -29 & -43 & -51 \\ 48 & 20 & -20 & -48 & -48 & -20 & 20 & 48 \\ 43 & -10 & -51 & -29 & 29 & 51 & 10 & -43 \\ 37 & -37 & -37 & 37 & 37 & -37 & -37 & 37 \\ 29 & -51 & 10 & 43 & -43 & -10 & 51 & -29 \\ 20 & -48 & 48 & -20 & -20 & 48 & -48 & 20 \\ 10 & -29 & 43 & -51 & 51 & -43 & 29 & -10 \end{bmatrix}$$

After the 8×8 forward integer DCT transform operation, in order to guarantee sixteen-bit operation, transformer 420 may bit-shift the value of the transform coefficients two bits to the right.

In at least one embodiment, in the case of an 16×16 transform block, transformer 420 may perform a forward integer DCT transform operation according to the following equation:

$$\vec{y} = T_{16\times16}\vec{x}$$

Where: $\vec{x}$ is the input residual-value vector for the current transform block, $\vec{y}$ is the output vector for the transform operation, and $T_{16\times16}$ is a 16×16 forward integer transform matrix, given by:

$$T_{16\times16} = \begin{bmatrix} t_0 \\ t_1 \\ t_2 \\ \vdots \\ t_{14} \\ t_{15} \end{bmatrix}$$

Where $t_0, t_1, t_2 \ldots t_{14}, t_{15}$ are defined in Table 2, below.

After the 16×16 forward integer DCT transform operation, in order to guarantee sixteen-bit operation, transformer 420 may bit-shift the value of the transform coefficients two bits to the right.

(pred) obtained from motion compensated predictor 530 by using corresponding motion vectors (mv). The resulting decoded video (dv) may be deblock-filtered in a frame assembler and deblock filtering processor 524. Blocks (recd) at the output of frame assembler and deblock filtering processor 528 form a reconstructed frame of the video sequence, which may be output from the decoder 500 and also may be used as the reference frame for a motion compensated predictor 530 for decoding subsequent coding blocks.

7. Inverse Integer Transform Procedures

Referring to the functionality of inverse transformer 516, the inverse transformer obtains blocks of de-quantized sixteen-bit integer transform coefficients from inverse quantizer 512. The inverse transformer 516 performs an inverse integer DCT transform operation on the transform coefficients obtained from inverse quantizer 512 in order to reverse the forward integer DCT transform operation performed by transformer 420, described above, and recover the residual values.

TABLE 2

| | | | | | | | | | | | | | | | | |
|---|---|---|---|---|---|---|---|---|---|---|---|---|---|---|---|---|
| $t_0 =$ | { 26 | 26 | 26 | 26 | 26 | 26 | 26 | 26 | 26 | 26 | 26 | 26 | 26 | 26 | 26 | 26 } |
| $t_1 =$ | { 37 | 35 | 32 | 28 | 23 | 17 | 11 | 4 | −4 | −11 | −17 | −23 | −28 | −32 | −35 | −37 } |
| $t_2 =$ | { 36 | 31 | 20 | 7 | −7 | −20 | −31 | −36 | −36 | −31 | −20 | −7 | 7 | 20 | 31 | 36 } |
| $t_3 =$ | { 35 | 23 | 4 | −17 | −32 | −37 | −28 | −11 | 11 | 28 | 37 | 32 | 17 | −4 | −23 | −35 } |
| $t_4 =$ | { 34 | 14 | −14 | −34 | −34 | −14 | 14 | 34 | 34 | 14 | −14 | −34 | −34 | −14 | 14 | 34 } |
| $t_5 =$ | { 32 | 4 | −28 | −35 | −11 | 23 | 37 | 17 | −17 | −37 | −23 | 11 | 35 | 28 | −4 | −32 } |
| $t_6 =$ | { 31 | −7 | −36 | −20 | 20 | 36 | 7 | −31 | −31 | 7 | 36 | 20 | −20 | −36 | −7 | 31 } |
| $t_7 =$ | { 28 | −17 | −35 | 4 | 37 | 11 | −32 | −23 | 23 | 32 | −11 | −37 | −4 | 35 | 17 | −28 } |
| $t_8 =$ | { 26 | −26 | −26 | 26 | 26 | −26 | −26 | 26 | 26 | −26 | −26 | 26 | 26 | −26 | −26 | 26 } |
| $t_9 =$ | { 23 | −32 | −11 | 37 | −4 | −35 | 17 | 28 | −28 | −17 | 35 | 4 | −37 | 11 | 32 | −23 } |
| $t_{10} =$ | { 20 | −36 | 7 | 31 | −31 | −7 | 36 | −20 | −20 | 36 | −7 | −31 | 31 | 7 | −36 | 20 } |
| $t_{11} =$ | { 17 | −37 | 23 | 11 | −35 | 28 | 4 | −32 | 32 | −4 | −28 | 35 | −11 | −23 | 37 | −17 } |
| $t_{12} =$ | { 14 | −34 | 34 | −14 | −14 | 34 | −34 | 14 | 14 | −34 | 34 | −14 | −14 | 34 | −34 | 14 } |
| $t_{13} =$ | { 11 | −28 | 37 | −32 | 17 | 4 | −23 | 35 | −35 | 23 | −4 | −17 | 32 | −37 | 28 | −11 } |
| $t_{14} =$ | { 7 | −20 | 31 | −36 | 36 | −31 | 20 | −7 | −7 | 20 | −31 | 36 | −36 | 31 | −20 | 7 } |
| $t_{15} =$ | { 4 | −11 | 17 | −23 | 28 | −32 | 35 | −37 | 37 | −35 | 32 | −28 | 23 | −17 | 11 | −4 } |

Depending on the number of transform blocks per coding block, it may be possible to further increase coding efficiency by performing an additional transform operation on the DC coefficient of each transform block. The DC coefficients are collected into a DC integer transform block and transformed again, for example in accordance with one of the forward integer DCT transform operations described above. This process is called a double transform.

6. Software Implemented Interframe Decoder

Figure 5:
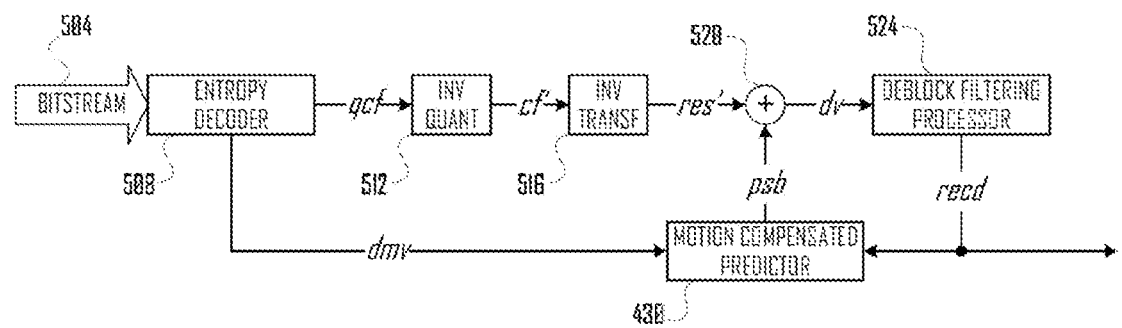
FIG. 5 illustrates a block diagram of an exemplary video decoder in accordance with at least one embodiment.

FIG. 5 shows a general functional block diagram of a corresponding software implemented interframe video decoder 500 (hereafter "decoder 500") inverse residual transformation techniques in accordance with at least one embodiment and being suitable for use with a decoding device, such as decoding device 300. Decoder 500 may work similarly to the local decoding loop 455 at encoder 400.

Specifically, an encoded video bit-stream 504 to be decoded may be provided to an entropy decoder 508, which may decode blocks of quantized coefficients (qcf), differential motion vectors (dmv), accompanying message data packets (msg-data), and other data. The quantized coefficient blocks (qcj) may then be inverse quantized by an inverse quantizer 512, resulting in de-quantized coefficients (cf'). De-quantized coefficients (cf' may then be inverse transformed out of the frequency-domain by an inverse transformer 516 (described below), resulting in decoded residual blocks (res'). An adder 520 may add the decoded residual blocks (res') with motion compensated prediction blocks If the transform coefficients of the current coding block have been double transformed, inverse transformer performs an inverse double transform procedure, as is described below. After the DC transform coefficients have been inverse transformed and inserted back into their corresponding transform blocks, inverse transformer proceeds to perform an inverse integer DCT transformation operation.

For example, in at least one embodiment, for a block of sixteen-bit integer transform coefficients corresponding to a 4×4 transform block, inverse transformer 516 may perform an inverse integer DCT transform operation according to the following equation:

$$\vec{y'} = T_{4\times4}^{-1} \vec{x_q}$$

Where: $\vec{x_q}$ is the quantized transform coefficient vector, $\vec{y'}$ is the recovered residual-value vector, and $T_{4\times4}^{-1}$ is a 4×4 inverse integer transform matrix, given by:

$$T_{4\times4}^{-1} = \begin{bmatrix} 13 & 17 & 13 & 7 \\ 13 & 7 & -13 & -17 \\ 13 & -7 & -13 & 17 \\ 13 & -17 & 13 & -7 \end{bmatrix}$$

After the 4×4 inverse integer DCT transform operation, in order to guarantee sixteen-bit operation, inverse transformer may bit-shift the value of the resulting residual values five bits to the right.

In at least one embodiment, for a block of sixteen-bit integer transform coefficients corresponding to an 8×8 transform block, inverse transformer 516 may perform an inverse integer DCT transform operation according to the following equation:

$$\vec{y'} = T_{8\times8}^{-1} \vec{x_q}$$

Where: $\vec{x_q}$ is the quantized transform coefficient vector, $\vec{y'}$ is the recovered residual-value vector, and $T_{8\times8}^{-1}$ is an 8×8 inverse integer transform matrix, for example the inverse of the 8×8 forward integer transform matrix, $T_{8\times8}$, described above.

After the 8×8 inverse integer DCT transform operation, in order to guarantee sixteen-bit operation, inverse transformer may bit-shift the value of the resulting residual values seven bits to the right.

In at least one embodiment, for a block of sixteen-bit integer transform coefficients corresponding to a 16×16 transform block, inverse transformer 516 may perform an inverse integer DCT transform operation according to the following equation:

$$\vec{y'} = T_{16\times16}^{-1} \vec{x_q}$$

Where: $\vec{x_q}$ is the quantized transform coefficient vector, $\vec{y'}$ is the recovered residual value vector and $T_{16\times16}^{-1}$ is a 16×16 inverse integer transform matrix, for example the inverse of the 16×16 forward integer transform matrix, $T_{16\times16}$ described above.

After the 16×16 inverse integer DCT transform operation, in order to guarantee sixteen-bit operation, inverse transformer may bit-shift the value of the resulting residual values seven bits to the right.

8. Transform-Block-Processing-Routine

Figure 6:
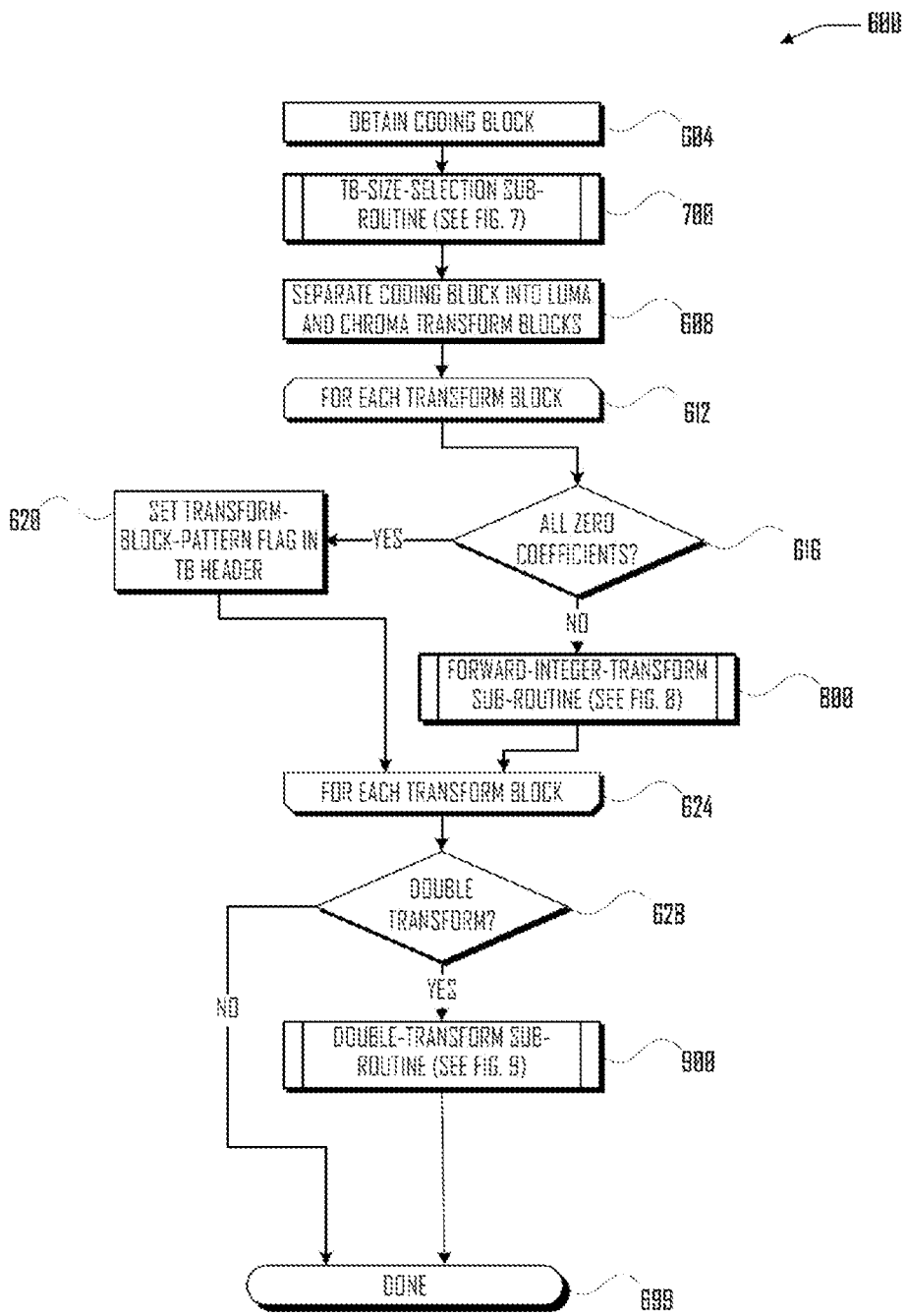
FIG. 6 illustrates a transform-block-processing routine in accordance with at least one embodiment.

FIG. 6 illustrates a transform-block-processing routine 600 suitable for use with at least one embodiment, such as encoder 400. As will be recognized by those having ordinary skill in the art, not all events in the encoding process are illustrated in FIG. 6. Rather, for clarity, only those steps reasonably relevant to describing the illustrated embodiment are shown.

At execution block 604, transform-block-processing routine 600 obtains a coding block of integer residual values for a current frame being encoded. Transform-block-processing routine 600 then provides the size of the current coding block and the size of the corresponding prediction blocks used in motion estimation to transform-block-size-selection sub-routine 700 (described below in reference to FIG. 7), which returns appropriate chroma and luma transform block sizes for the current combination of current coding block size and prediction block size.

At execution block 608, transform-block-processing routine 600 then separates the current coding block into one or more transform blocks of sixteen-bit integer residual values according to the chroma and luma transform block sizes returned by transform-block-size-selection sub-routine 700, above.

At starting loop block 612, each transform block of the current coding block is processed in turn.

At decision block 616, if each of the residual values of the current transform block has a zero value, then at execution block 620, transform-block-processing routine 600 sets a corresponding transform-block-pattern flag in the transform block header of the current transform block.

Otherwise, at decision block 616, if one or more of the residual values of the current transform block has a non-zero value, then transform-block-processing routine 600 calls forward-integer-transform sub-routine 800 (described below in reference to FIG. 8), which returns a corresponding block of sixteen-bit integer transform coefficients.

At ending loop block 624, transform-block-processing routine 600 iterates back to starting loop block 612 to process the next transform block of the current coding block (if any).

At decision block 628, if the transform blocks of the current coding block can be double transformed, e.g., there are sixteen or sixty four transform blocks in the current coding block, then transform-block-processing routine 600 may call double-transform sub-routine 900 (described below in reference to FIG. 9) which performs an additional transform operation on the DC integer-transform coefficients of the transform blocks of the current coding block and returns a corresponding double-transformed block of sixteen-bit integer-transform coefficients.

After double-transform sub-routine 900 returns the double-transformed block of sixteen-bit integer-transform coefficients, or, referring again to decision block 628, if the current coding block is not amenable to a double transform, then transform-block-processing routine 600 ends for the current coding block at termination block 699.

9. Transform-Block-Size-Selection Sub-Routine

Figure 7:
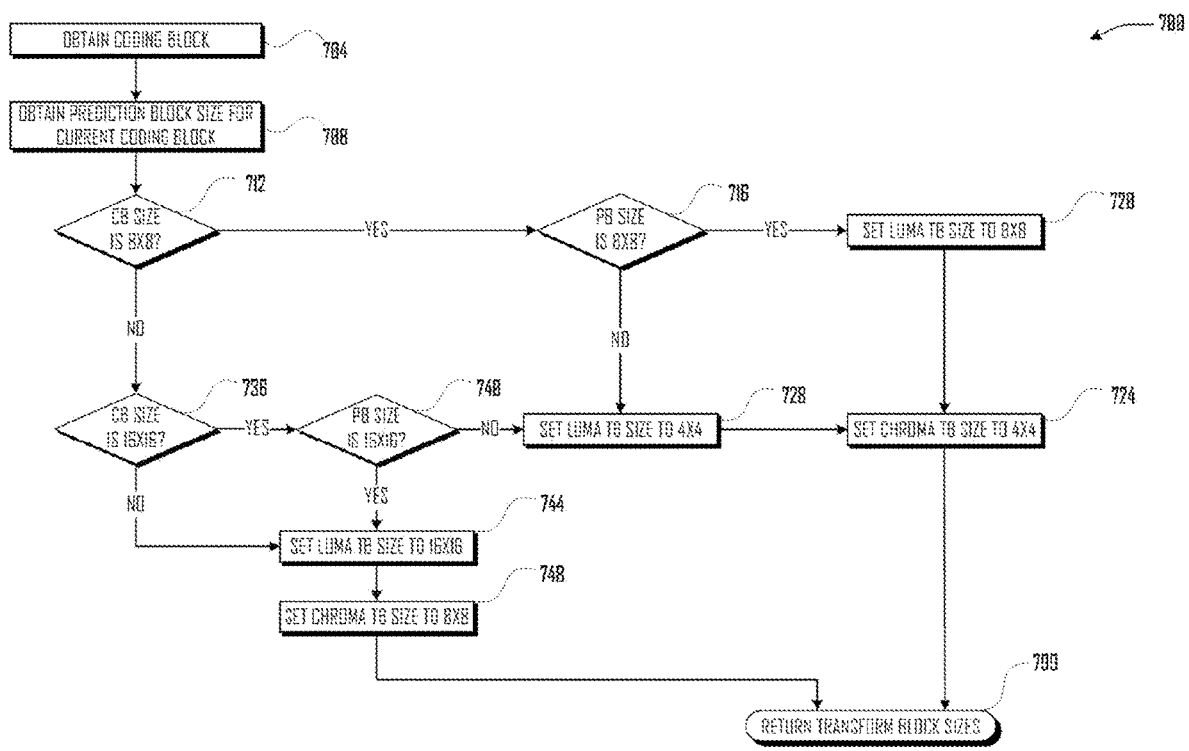
FIG. 7 illustrates a transform-block-size-selection subroutine in accordance with at least one embodiment.

FIG. 7 illustrates a transform-block-size-selection sub-routine 700 suitable for use with at least one embodiment, such as transform-block-processing routine 600.

At execution block 704, transform-block-size-determination sub-routine 700 obtains the coding block size and the prediction block size used for the motion estimation process of the current coding block.

At decision block 712, if the coding block size of the current coding block is 8×8 pixels, then transform-block-size-determination sub-routine 700 proceeds to decision block 716.

At decision block 716, if the prediction block size for the current coding block is 8×8 pixels, then at execution block 720, transform-block-size-determination sub-routine 700 sets the luma transform block size for the current coding block to 8×8 luma transform coefficients and, at execution block 724, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 799.

Referring again to decision block 716, if the prediction block size for the current coding block is not 8×8 pixels, then at execution block 728, transform-block-size-determination sub-routine 700 sets the luma transform block size for the current coding block to 4×4 luma transform coefficients. Transform-block-size-determination sub-routine 700 then proceeds to execution block 724. As described above, at execution block 724, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 799.

Referring again to decision block 712, if the coding block size for the current coding block is not 8×8 pixels, transform-block-size-determination sub-routine 700 proceeds to decision block 736.

At decision block 736, if the coding block size for the current coding block is 16×16 pixels, then transform-block-size-determination sub-routine 700 proceeds to decision block 740.

At decision block 740, if the prediction block size for the current coding block is 16×16 pixels, then at execution block 744, transform-block-size-determination sub-routine 700 sets the luma transform block size for the current coding block to 16×16 luma transform coefficients, and, at execution block 748, transform-block-size-determination sub-routine then sets the chroma transform block size for the current coding block to 8×8 chroma transform coefficients. Transform-block-size-determination sub-routine then returns the luma transform block size and the chroma transform block size for the current coding block at return block 799.

Referring again to decision block 740, if the prediction block size for the current coding block is not 16×16 pixels, then transform-block-size-determination sub-routine 700 proceeds to execution block 728. As described above, at execution block 728, transform-block-size-determination sub-routine 700 sets the luma transform block size for the current coding block to 4×4 luma transform coefficients. Transform-block-size-determination sub-routine 700 then proceeds to execution block 724. As described above, at execution block 724, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 799.

Referring again to decision block 736, if the coding block size for the current coding block is not 16×16 pixels, then transform-block-size-determination sub-routine 700 proceeds to execution block 744. As described above, at execution block 744, transform-block-size-determination sub-routine 700 sets the luma transform block size for the current coding block to 16×16 luma transform coefficients, and, at execution block 748, transform-block-size-determination sub-routine then sets the chroma transform block size for the current coding block to 8×8 chroma transform coefficients. Transform-block-size-determination sub-routine then returns the luma transform block size and the chroma transform block size for the current coding block at return block 799.

10. Forward-Integer-Transform Sub-Routine

Figure 8:
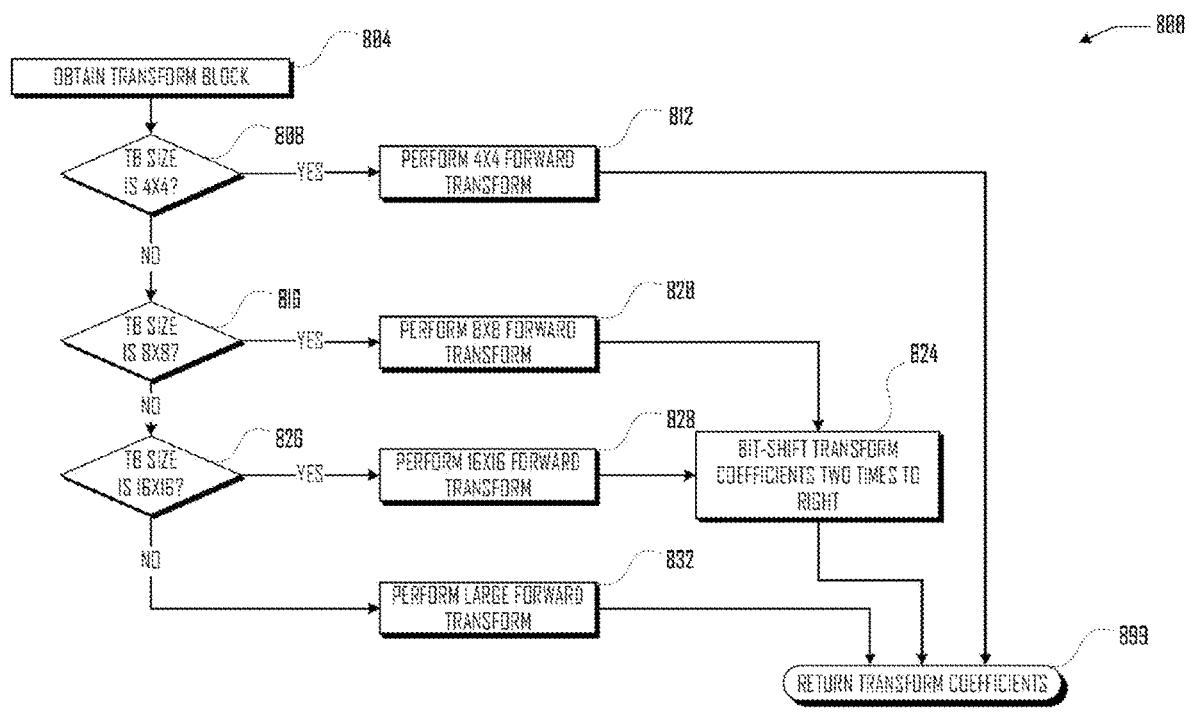
FIG. 8 illustrates a forward-integer-transform sub-routine in accordance with at least one embodiment.

FIG. 8 illustrates a forward-integer-transform sub-routine 800 suitable for use with at least one embodiment, such as transform-block-processing routine 600 or double-transform sub-routine 900, described below in reference to FIG. 9.

At execution block 804, forward-integer-transform sub-routine obtains a transform block, for example from transform-block-processing routine 600.

At decision block 808, if the current transform block is a 4×4 block of integer transform coefficients, then at execution block 812, forward-integer-transform sub-routine 800 performs a 4×4 forward transform, for example the 4×4 forward integer transform operation described above. Forward-integer-transform sub-routine 800 then returns the transform coefficients obtained via the 4×4 integer transform at return block 899.

Referring again to decision block 808, if the current transform block is not a 4×4 block of integer transform coefficients, for example an 8×8, a 16×16, a 32×32, or a 64×64 block of integer transform coefficients, then forward-integer-transform sub-routine 800 proceeds to decision block 816.

At decision block 816, if the current transform block is an 8×8 block of integer transform coefficients, then at execution block 820, forward-integer-transform sub-routine 800 performs an 8×8 forward transform, for example the 8×8 forward integer transform operation described above. At execution block 824, forward-integer-transform sub-routine 800 manipulates the transform coefficients obtained via the 8×8 integer transform at execution block 820, bit-shifting the transform coefficients twice to the right in order to ensure the transform coefficients may be represented by no more than sixteen bits. Forward-integer-transform sub-routine 800 returns the bit-shifted transform coefficients at return block 899.

Referring again to decision block 816, if the current transform block is not an 8×8 block of integer transform coefficients (for example, if it is a 16×16, a 32×32 or 64×64 block of integer transform coefficients), then forward-integer-transform sub-routine 800 proceeds to decision block 826.

At decision block 826, if the current transform block is a 16×16 block of integer transform coefficients, then at execution block 828, forward-integer-transform sub-routine 800 performs a 16×16 forward transform, for example the 16×16 forward integer transform operation described above. Forward-integer-transform sub-routine 800 then proceeds to execution block 824. As described above, at execution block 824, forward-integer-transform sub-routine 800 manipulates the transform coefficients obtained via the 8×8 integer transform at execution block 820, bit-shifting the transform coefficients twice to the right in order to ensure the transform coefficients may be represented by no more than sixteen bits. Forward-integer-transform sub-routine 800 returns the bit-shifted transform coefficients at return block 899.

Referring again to decision block 826, if the current transform block is larger than a 16×16 block of integer transform coefficients, for example a 32×32 or 64×64 block of integer transform coefficients, then at execution block 832, forward-integer-transform sub-routine 800 performs a large-transform procedure. Forward-integer-transform sub-routine 800 returns the results of the large integer transform procedure at return block 899.

11. Double-Transform Sub-Routine

Figure 9:
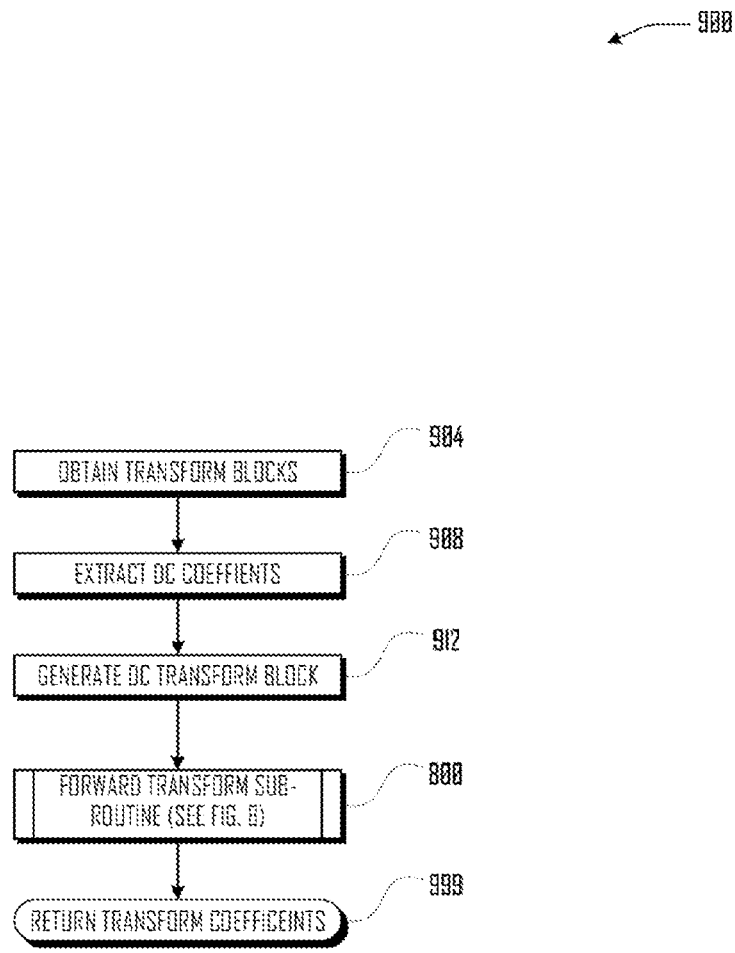
FIG. 9 illustrates a double-transform sub-routine in accordance with at least one embodiment.

FIG. 9 illustrates a double-transform sub-routine 900 suitable for use with at least one embodiment, such as transform-block-processing routine 600.

At execution block 904, double-transform sub-routine 900 obtains transform blocks of intermediate integer transform coefficients for the current coding block.

At execution block 908, double-transform sub-routine 900 extracts the intermediate DC coefficient from each block of intermediate integer transform coefficients.

At execution block 912, double-transform sub-routine 900 generates a transform block of the intermediate DC coefficients.

Double-transform sub-routine 900 then passes the intermediate DC coefficients to forward-transform sub-routine 800, which returns a (now double-transformed) block of sixteen-bit integer-transform coefficients.

Double-transform sub-routine 900 returns the double-transformed transform block at return block 999.

12. Transform-Block-Recovery Routine

Figure 10:
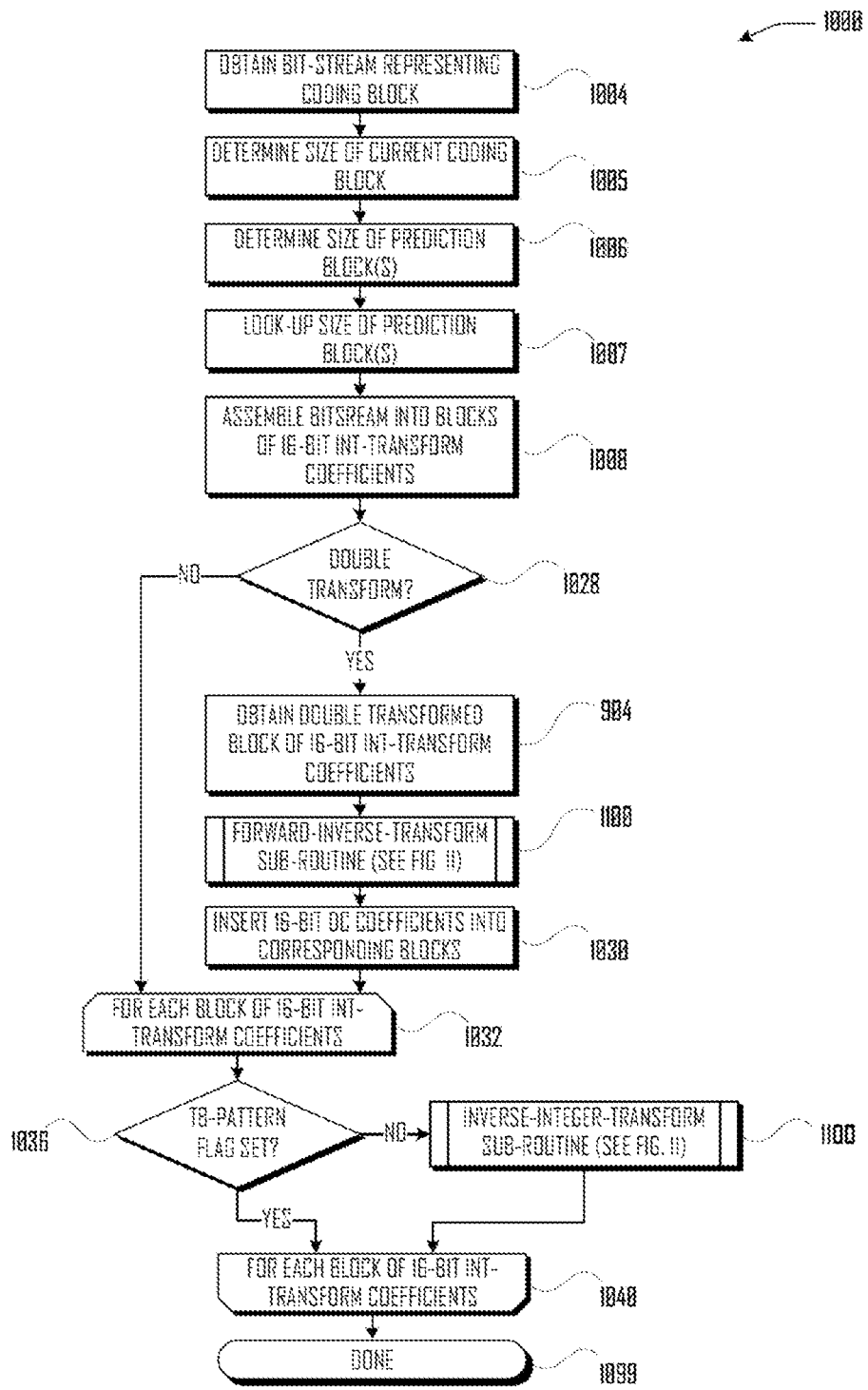
FIG. 10 illustrates a transform-block-recovery routine in accordance with at least one embodiment.

FIG. 10 illustrates a transform-block-recovery routine 1000 suitable for use with at least one embodiment, such as decoder 500. As will be recognized by those having ordinary skill in the art, not all events in the decoding process are illustrated in FIG. 10. Rather, for clarity, only those steps reasonably relevant to describing the transform-block-recovery routine 1000 are shown.

At execution block 1004, transform-block-recovery routine 1000 obtains a block of de-quantized transform coefficients, for example from inverse quantizer 512.

At execution block 1005, transform-block-recovery routine 1000 determines a size of the current coding block.

At execution block 1006, transform-block-recovery routine 1000 determines a size of the prediction block(s) used for motion prediction for the current coding block.

At execution block 1007, transform-block-recovery routine 1000 looks up the size of the prediction blocks for the corresponding combination of current coding block size and the size of the prediction block(s) used for motion prediction for the current coding block.

At execution block 1008, transform-block-recovery routine 1000 then assembles the de-quantized transform coefficients into one or more transform blocks of sixteen-bit integer-transform coefficients according to the transform block sizes obtained at execution block 1007, above.

At decision block 1028, if the transform blocks of the current coding block have not been double transformed, then transform-block-recovery routine 1000 proceeds to starting loop block 1032, described below. If the transform blocks of the current coding block have been double transformed (e.g., if they include a double-transformed block of sixteen-bit integer DC transform coefficients), then transform-block-recovery routine 1000 calls inverse-integer-transform sub-routine 1100 (described below in reference to FIG. 11) which performs an initial inverse transform operation on the double-transformed block of sixteen-bit integer-transform coefficients of the transform blocks of the current coding block and returns a corresponding block of intermediate sixteen-bit integer DC transform coefficients.

At execution block 1030, transform-block-recovery routine 1000 inserts the appropriate sixteen-bit integer DC transform coefficient into the corresponding block of sixteen-bit integer transform coefficients and proceeds to starting loop block 1032, described below.

Beginning at starting loop block 1032, transform-block-recover routine 1000 processes each transform block of sixteen-bit integer-transform coefficients in turn.

At decision block 1036, if the transform-block-pattern flag for the corresponding transform block is set in the transform block header, then at ending loop block 1040, transform-block-recovery routine 1000 iterates back to starting loop block 1032 to process the next block of sixteen-bit integer-transform coefficients of the current coding block (if any).

If, at decision block 1036, the transform-block-pattern flag for the corresponding transform block is not set in the transform block header, then transform-block-recovery routine 1000 calls inverse-transform sub-routine 1100 (described below in reference to FIG. 11), which returns a block of recovered residual values.

At ending loop block 1040, transform-block-recovery routine 1000 iterates back to starting loop block 1032 to process the next transform block of the current coding block (if any).

Transform-block-recovery routine 1000 ends at termination block 1099.

13. Inverse-Integer-Transform Sub-Routine

Figure 11:
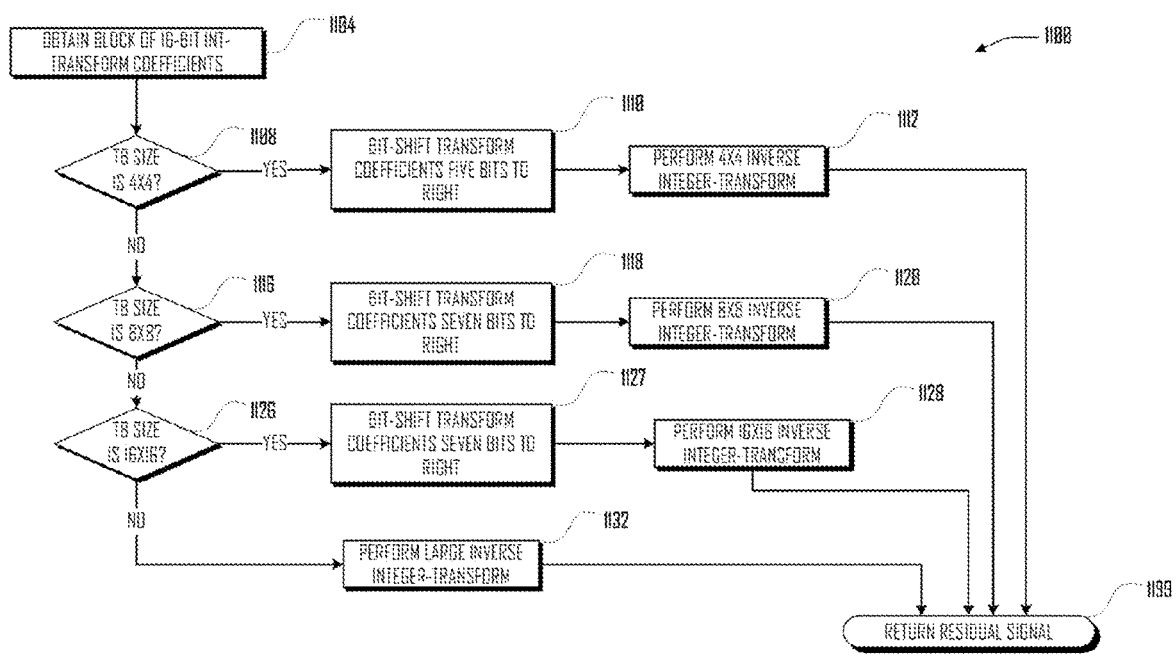
FIG. 11 illustrates an inverse-integer-transform sub-routine in accordance with at least one embodiment.

FIG. 11 illustrates an inverse-integer-transform sub-routine 1100 suitable for use with at least one embodiment, such as transform-block-recovery routine 1000.

At execution block 1104, inverse-integer-transform sub-routine 1100 obtains a transform block, for example from transform-block-recovery routine 1000.

At decision block 1108, if the transform block is a 4×4 transform block, then at execution block 1110, inverse-integer-transform sub-routine 1100 performs a 4×4 inverse-integer transform, for example the 4×4 inverse-integer transform described above. At execution block 1112, inverse-integer-transform sub-routine 1100 bit-shifts the resulting integer transform coefficients five bits to the right. Inverse-integer-transform sub-routine 1100 returns the bit-shifted integer transform coefficients at return block 1199.

Referring again to decision block 1108, if the transform block is not a 4×4 transform block, then inverse-integer-transform sub-routine 1100 proceeds to decision block 1116.

At decision block 1116, if the transform block is an 8×8 transform block, then at execution block 1118, inverse-integer-transform sub-routine 1100 performs an 8×8 inverse-integer transform, for example the 8×8 inverse-integer transform described above. At execution block 1120, inverse-integer-transform sub-routine 1100 bit-shifts the resulting integer transform coefficients seven bits to the right. Inverse-integer-transform sub-routine 1100 returns the bit-shifted integer transform coefficients at return block 1199.

Referring again to decision block 1116, if the transform block is not an 8×8 transform block, then inverse-integer-transform sub-routine 1100 proceeds to decision block 1126.

At decision block 1126, if the transform block is a 16×16 transform block, then at execution block 1127, inverse-integer-transform sub-routine 1100 performs a 16×16 inverse-integer transform, for example the 16×16 inverse-integer transform described above. At execution block 1128, inverse-integer-transform sub-routine 1100 bit-shifts the resulting integer-transform coefficients seven bits to the right. Inverse-integer-transform sub-routine 1100 returns the bit-shifted integer transform coefficients at return block 1199.

Referring again to decision block 1126, if the transform block is larger than a 16×16 transform block, for example a 32×32 or 64×64 transform block, then at execution block 1132, inverse-integer-transform sub-routine 1100 performs a large inverse-transform procedure. At return block 1199, inverse-integer-transform sub-routine 1100 returns the results of the large integer transform procedure.

Figure 12:
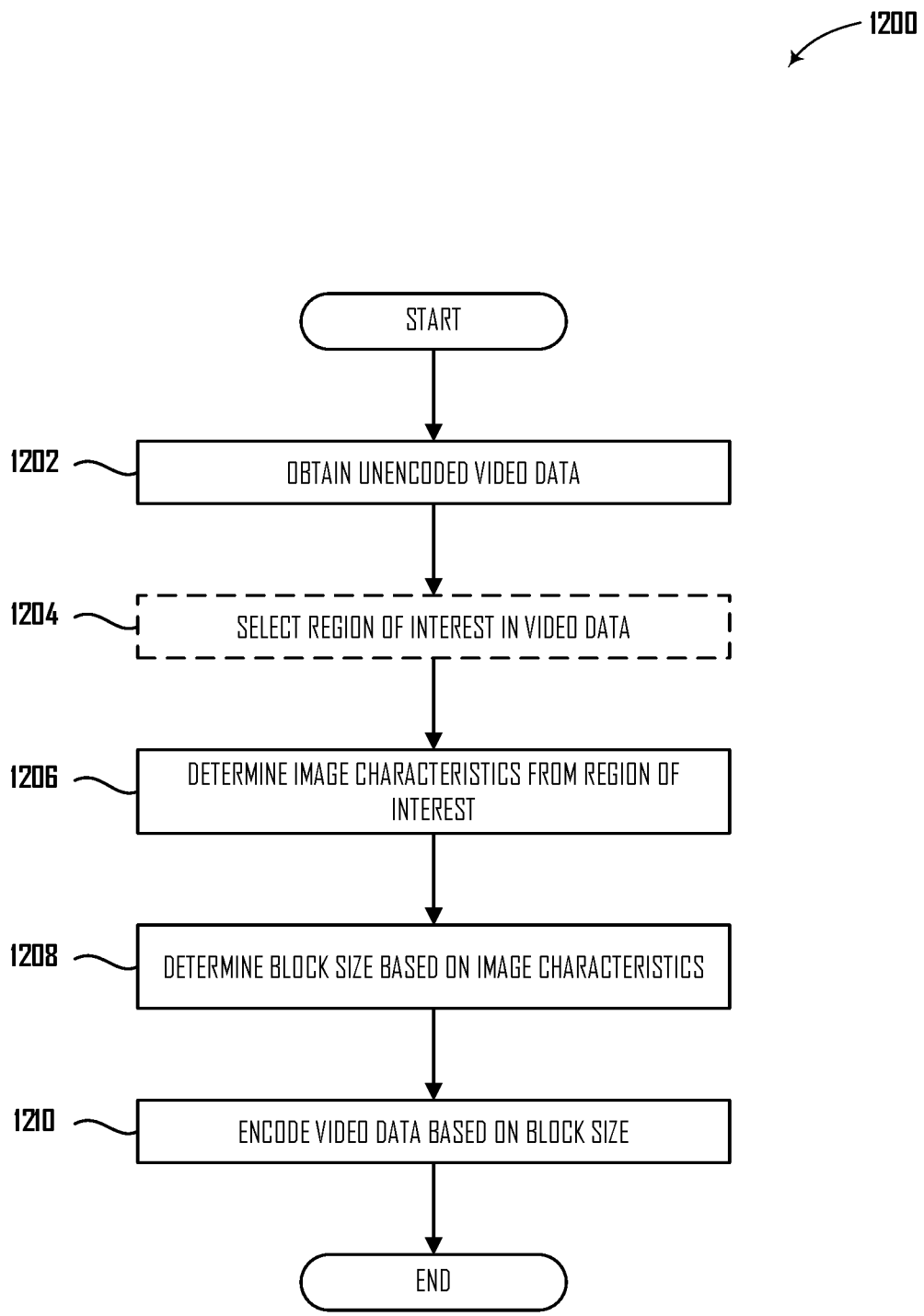
FIG. 12 illustrates an alternative block-size-selection subroutine for an encoder in accordance with at least one embodiment.

FIG. 12 illustrates a block-size-selection routine 1200 suitable for use with at least one embodiment, such as encoder 400 in FIG. 4. As will be recognized by those having ordinary skill in the art, not all events in the encoding process are illustrated in FIG. 12. Rather, for clarity, only those steps reasonably relevant to describing the illustrated embodiments are shown.

In some embodiments, the block-size-selection routine 1200 is utilized to determine a coding block size, such as the maximum coding block size, for encoding the unencoded video data stream. In other embodiments, the block-size-selection routine 1200 is utilized to determine a transform block size, such as a maximum transform block size, for encoding a residual block or residual signal data. In some other embodiments, the block-size-selection routine 1200 may be separately executed to first determine a coding block size for encoding the unencoded video data stream and subsequently determine a transform block size for encoding the residual block.

At execution block 1202, block-size-selection routine 1200 obtains unencoded video data. In embodiments where the block-size-selection routine 1200 is determining a coding block size, the obtained unencoded video data may be unencoded video frames. For example, the unencoded video frame may include an unprocessed, unencoded video frame or pre-processed video frame prior to dividing the unencoded frame into an array of coding blocks, such as by blocks indexer 408 in FIG. 4. In embodiments where the block-size-selection routine 1200 is determining a transform block size, the obtained unencoded video data may be the coding blocks generated by the blocks indexer 408 or residual blocks generated from the difference 412 prior to the residual blocks being forward-transformed to a frequency-domain representation by transformer 420.

At execution block 1204, block-size-selection routine 1200 selects a region of interest in the video data. The region of interest is an area or portion of the video data (e.g., an area of an unencoded video frame, an area of a coding block, or an area of a residual block). The region of interest may be smaller than the obtained video data. For example, the region of interest may be a top half or some pre-defined area of pixels in a center of an image frame or block. In some embodiments, execution block 1204 is optional and may not be performed. In at least one such embodiment, the region of interest may be the entire video frame or block.

At execution block 1206, block-size-selection routine 1200 determines at least one image characteristic of the video data in the region of interest. In various embodiments, the at least one image characteristic that the video data is analyzed for may be selected by a user of the encoder, an administrator, or otherwise predefined. The at least one image characteristic may include a texture complexity, a luminance, a chrominance, gradient information, entropy information, or histogram information, or some combination thereof, of the video data within the region of interest.

In some embodiments, the video data may be analyzed to determine texture complexity of the video data within the region of interest. Determining the texture complexity may be performed using known image processing techniques to identify information about the spatial arrangement of color or intensities in the video data. In at least one embodiment, the texture complexity may be a total number of edges in the region of interest.

In some embodiments, the video data may be analyzed to determine luminance of the video data within the region of interest. Determining the luminance may be performed using known image processing techniques to identify the brightness of the video data. In at least one embodiment, the luminance may be an average luminance or array of a plurality of luminance values of pixels within the region of interest.

In some embodiments, the video data may be analyzed to determine chrominance of the video data within the region of interest. Determining the chrominance may be performed using known image processing techniques to identify the color of the video data. In at least one embodiment, the chrominance may be an average chrominance or array of a plurality of chrominance values of pixels within the region of interest.

In some embodiments, the video data may be analyzed to determine gradient information of the video data within the region of interest. Determining the gradient information may be performed using known image processing techniques to identify the directional change in the intensity or color of the video data. In at least one embodiment, the gradient information may be an average gradient vector or array of a plurality of gradient vectors between pairs of pixels within the region or interest.

In some embodiments, the video data may be analyzed to determine entropy information of the video data within the region of interest. Determining the entropy information may be performed using known image processing techniques to identify the statistical randomness of the video data. In at least one embodiment, the entropy information may be an average or statistical value of randomness among the pixels within the region or interest.

In some embodiments, the video data may be analyzed to determine histogram information of the video data within the region of interest. Determining the histogram information may be performed using known image processing techniques to identify the graphical representation of tonal distribution of the video data. In at least one embodiment, the histogram information may be multi-dimensional graph or representation of the number of pixels for each tonal value of the pixels within the region or interest.

At execution block 1208, block-size-selection routine 1200 determines a block size based on the at least one image characteristic. In various embodiments a user, administrator, or designer of the encoder may select one or more thresholds for determining the block size. For example, if the luminance is below a first threshold value, then a first block size may be selected; if the luminance exceeds the first threshold, but is below a second threshold value, then a second block size may be selected; and if the luminance exceeds the second threshold, then a third block size may be selected. Other thresholds may be similarly utilized for other image characteristics.

It should be recognized that different image characteristics may utilized different threshold values and different numbers of thresholds to determine the block size. Moreover, different combinations of different thresholds of different image characteristics may also be used to select different block sizes.

At execution block 1210, block-size-selection routine 1200 encodes the video data based on the determined block size. In embodiments where the block-size-selection routine 1200 is determining a coding block size, the obtained unencoded video data is divided into coding blocks based on the determined coding block size determined at block 1208, which are then further processed to encode the video data. In embodiments where the block-size-selection routine 1200 is determining a transform block size, the residual blocks are further processed for encoding based on the transform block size selected at block 1208.

Because the image characteristics of the video data are utilized to determine the block size, the video data is encoded based on the determined block size without storing the determined block size in a header associated with the encoded video data.

Figure 13:
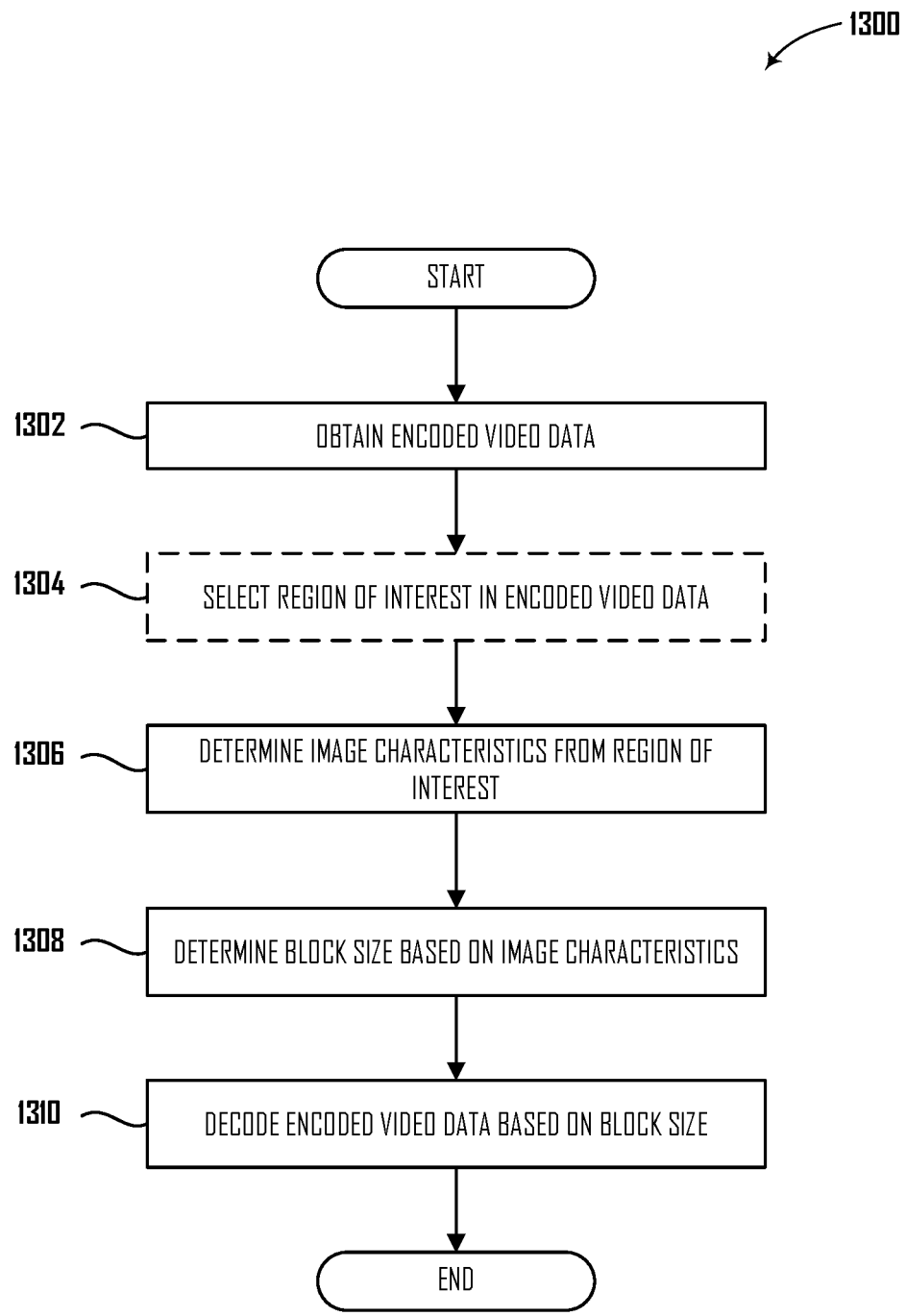
FIG. 13 illustrates an alternative block-size-selection subroutine for a decoder in accordance with at least one embodiment.

FIG. 13 illustrates a block-size-selection routine 1300 suitable for use with at least one embodiment, such as decoder 500. As will be recognized by those having ordinary skill in the art, not all events in the decoding process are illustrated in FIG. 13. Rather, for clarity, only those steps reasonably relevant to describing the illustrated embodiment are shown.

In some embodiments, the block-size-selection routine 1300 is utilized to determine a coding block size, such as a maximum coding block size, for decoding encoded image data. In other embodiments, the block-size-selection routine 1300 is utilized to determine a transform block size, such as maximum transform block size, for decoding residual block or signal data. In some other embodiments, the block-size-selection routine 1300 may be separately executed to determine a transform block size for decoding the encoded data into residual block and subsequently determine a coding block size for further decoding processing to generate the unencoded image data.

In various embodiments, the block-size-selection routine 1300 to decode the encoded video data is performed in an opposite but complementary manner that is similar to the block-size-selection routine 1200 to encode the video data. For example, if the block-size-selection routine 1200 is used to determine the coding block size and encode the video data based on the determined coding block size then the block-size-selection routine 1300 is similarly used to determine the coding block size and to decode the encoded video data. Likewise, if the block-size-selection routine 1200 is used to determine the transform block size and encode the video data based on the determined transform block size then the block-size-selection routine 1300 is similarly used to determine the transform block size and to decode the encoded video data.

At execution block 1302, block-size-selection routine 1300 obtains encoded video data. In embodiments where the block-size-selection routine 1300 is determining a coding block size, the obtained encoded video data may be decoded residual blocks of the video frame. In embodiments where the block-size-selection routine 1200 is determining a transform block size, the obtained encoded video data may be complete encoded video frame or pre-processed encoded video frame.

At execution block 1304, block-size-selection routine 1300 selects a region of interest in the video data. In various embodiments, this region of interest is an area or portion of the encoded video data that is representative of the region of interest selected at block 1204 in FIG. 12. In at least one embodiment, the region of interest selected at block 1304 may be positioned within the video data and proportional to the region of interest selected at block 1204 based on the type of encoding performed by the encoder.

At execution block 1306, block-size-selection routine 1200 determines at least one image characteristic of the encoded video data in the region of interest. In various embodiments, the at least one image characteristic that the video data is analyzed for may be the same image characteristic selected at block 1206 in FIG. 12. In various embodiments, the user of the encoder, administrator, or designer of the decoder selects or predefines image characteristics for the decoder that are also selected for the encoder.

At execution block 1308, block-size-selection routine 1300 determines a block size based on the at least one image characteristic. In various embodiments, one or more same or statistically similar thresholds to those thresholds utilized in block 1208 in FIG. 12 are utilized in block 1308 to determine the block size based on the image characteristic. In various embodiments, the user of the encoder, administrator, or designer of the decoder selects or predefines the thresholds for the decoder that are also selected for the encoder.

Because the image characteristics of the video data are utilized to determine the block size, the decoder determines block size without using block-size flags or data a header associated with the encoded video data to determine the block size.

At execution block 1310, block-size-selection routine 1300 decodes the video data based on the determined block size. In embodiments where the block-size-selection routine 1300 is determining a transform block size, the obtained encoded video data may be inverse transformed based on the determined transform block size resulting in decoded residual blocks. In embodiments where the block-size-selection routine 1300 is determining a coding block size, the decoded residual blocks of the video frame may be further processed based on the coding block size to generate the complete encoded video frame.

By utilizing the image characteristics of the video data to determine a block size that is utilized to encode the video data, the encoder does not have to set a flag in a header of any of the image frame, the coding block, or the transform block. As a result, the encoded data includes less data, which can reduce the bandwidth needed to transmit the encoded data from one computing device to another. When the decoder includes the same rules as the encoder to select the region of interest, determine the image characteristics, and determine the block size from those image characteristics (e.g., the thresholds utilized to select block sizes from the image characteristics), the decoder can decode the encoded video data without relying on flags in the headers of the image frames, coding blocks, or transform blocks.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A method, comprising: during an encoding process: obtaining video data for a video frame of a video bit-stream that is to be encoded as an encoded video bit-stream; selecting a first region of interest in the video data of the video frame; determining at least one first image characteristic of the video data within the first region of interest based on a first analysis of the video data in the first region of interest; determining a coding block size based on the at least one first image characteristic; separating the video frame into a plurality of coding blocks based on the determined coding block size; and for each respective coding block in the plurality of coding blocks: selecting a second region of interest in the respective coding block; determining at least one second image characteristic of the video data within the second region of interest based on a second analysis of the video data in the second region of interest; determining a transform block size based on the at least one second image characteristic; and encoding the video data of the respective coding block for the encoded video bit-stream based on the determined transform block size without storing the determined coding block size in a header associated with the encoded video bit-stream and without storing the determined transform block size in the header; and during a decoding process: obtaining the encoded video bit-stream; selecting a third region of interest in the encoded video data of the encoded video bit-stream; determining at least one third image characteristic of the encoded video data within the third region of interest based on a third analysis of the encoded video data in the third region of interest; determining the coding block size based on the at least one third image characteristic without using the header associated with the encoded video bit-stream to determine the coding block size; separating the encoded video data into the plurality of coding blocks based on the determined coding block size; and for each respective coding block in the plurality of coding blocks; selecting a fourth region of interest in the respective coding block; determining at least one fourth image characteristic of the encoded video data within the fourth region of interest based on a fourth analysis of the encoded video data in the fourth region of interest; determining the transform block size based on the at least one fourth image characteristic without using the header associated with the encoded video bit-stream to determine the transform block size; and decoding the encoded video data of the respective coding block for the encoded video bit-stream based on the determined transform block size.

2. The method of claim 1, wherein the third region of interest in the encoded video data corresponds to the first region of interest in the video data and the at least one third image characteristic is the same as the at least one first image characteristic.

3. The method of claim 1, wherein determining the at least one first image characteristic includes: determining color information of the video data within the first region of interest.

4. The method of claim 1, wherein determining the at least one first image characteristic includes: determining texture complexity of the video data within the first region of interest.

5. The method of claim 4, wherein determining the texture complexity includes at least one of: determining luminance of the video data within the first region of interest; or determining chrominance of the video data within the first region of interest.

6. The method of claim 1, wherein determining the at least one first image characteristic includes: determining gradient information of the video data within the first region of interest.

7. The method of claim 1, wherein determining the at least one first image characteristic includes: determining entropy information of the video data within the first region of interest.

8. The method of claim 1, wherein determining the at least one first image characteristic includes: determining histogram information of the video data within the first region of interest.

9. The method of claim 1, wherein encoding the video data based on the determined transform block size without storing the determined coding block size in the header associated with the encoded video bit-stream includes: encoding the video data based on the determined transform block size without setting a coding block-size flag in a frame header of the encoded video bit-stream.

10. The method of claim 1, wherein encoding the video data based on the determined transform block size without storing the determined transform block size in the header associated with the encoded video bit-stream includes: encoding the video data based on the determined transform block size without setting a transform block-size flag in a transform block header of the encoded video bit-stream.

11. A system, comprising: an encoder that, upon execution of first computing instructions by a first processor, performs first actions, including: obtaining video data for a video frame of a video bit-stream that is to be encoded as an encoded video bit-stream; selecting a first region of interest in the video data of the video frame; determining at least one first image characteristic of the video data within the first region of interest based on a first analysis of the video data in the first region of interest; determining a coding block size based on the at least one first image characteristic; separating the video frame into a plurality of coding blocks based on the determined coding block size; and for each respective coding block in the plurality of coding blocks: selecting a second region of interest in the respective coding block; determining at least one second image characteristic of the video data within the second region of interest based on a second analysis of the video data in the second region of interest; determining a transform block size based on the at least one second image characteristic; and encoding the video data of the respective coding block for the encoded video bit-stream based on the determined transform block size without storing the determined coding block size in a header associated with the encoded video bit-stream and without storing the determined transform block size in the header; and a decoder that, upon execution of second computing instructions by a second processor, performs second actions, including: receiving the encoded video bit-stream; selecting a third region of interest in the encoded video data of the encoded video bit-stream that corresponds to the first region of interest; determining at least one third image characteristic of the encoded video data within the third region of interest based on a third analysis of the encoded video data in the third region of interest, wherein the at least one third image characteristic corresponds to the at least one first image characteristic; determining the coding block size based on the at least one third image characteristic without using the header associated with the encoded video bit-stream to determine the coding block size; separating the encoded video data into the plurality of coding blocks based on the determined coding block size; and for each respective coding block in the plurality of coding blocks; selecting a fourth region of interest in the respective coding block that corresponds to the second region of interest; determining at least one fourth image characteristic of the encoded video data within the fourth region of interest based on a fourth analysis of the encoded video data in the fourth region of interest, wherein the at least one fourth image characteristic corresponds to the at least one second image characteristic; determining the transform block size based on the at least one fourth image characteristic without using the header associated with the encoded video bit-stream to determine the transform block size; and decoding the encoded video data in the respective coding block for the encoded video bit-stream based on the determined transform block size.

12. The system of claim 11, wherein the encoder determines the at least one first image characteristic by performing further actions, including at least one of: determining color information of the video data within the first region of interest; determining texture complexity of the video data within the first region of interest; determining gradient information of the video data within the first region of interest; determining entropy information of the video data within the first region of interest; or determining histogram information of the video data within the first region of interest.

13. The system of claim 11, wherein the encoder determines the at least one first image characteristic by performing further actions, including at least one of: determining luminance of the video data within the first region of interest; or determining chrominance of the video data within the first region of interest.

14. The system of claim 11, wherein the video data includes image frame data and the determined block size indicates a maximum coding block size for encoding the image frame data.

15. The system of claim 11, wherein the video data includes residual signal data and the determined block size indicates a maximum transform block size for encoding the residual signal data.

16. A non-transitory computer-readable storage medium having stored thereon instructions that when executed by a processor, cause the processor to perform actions, the actions comprising: during an encoding process: obtaining video data for a video frame of a video bit-stream that is to be encoded as an encoded video bit-stream; selecting a first region of interest in the video frame of the video frame; determining at least one first image characteristic of the video data within the first region of interest based on a first analysis of the video data in the first region of interest; determining a coding block size based on the at least one first image characteristic; dividing the video frame into an array of coding blocks based on the determined coding block size; and for each respective coding block in the array of coding blocks: selecting a second region of interest in the respective coding block; determining at least one second image characteristic of the video data within the second region of interest based on a second analysis of the video data in the second region of interest; determining a transform block size based on the at least one second image characteristic; and encoding the video data of the respective coding block for the encoded video bit-stream based on the determined transform block size without storing the determined coding block size in a header associated with the encoded video bit-stream and without storing the determined transform block size in the header of the encoded video bit-stream; and during a decoding process: obtaining the encoded video bit-stream; selecting a third region of interest in the encoded video data of the encoded video bit-stream; determining at least one third image characteristic of the encoded video data within the third region of interest based on a third analysis of the encoded video data in the third region of interest; determining the coding block size based on the at least one third image characteristic without using the header associated with the encoded video bit-stream to determine the coding block size; separating the encoded video data into the plurality of coding blocks based on the determined coding block size; and for each respective coding block in the plurality of coding blocks; selecting a fourth region of interest in the respective coding block; determining at least one fourth image characteristic of the encoded video data within the fourth region of interest based on a fourth analysis of the encoded video data in the fourth region of interest; determining the transform block size based on the at least one fourth image characteristic without using the header associated with the encoded video bit-stream to determine the transform block size; and decoding the encoded video data of the respective coding block for the encoded video bit-stream based on the determined transform block size.

* * * * *